United States Patent
Bomma et al.

(10) Patent No.: US 7,805,471 B2
(45) Date of Patent: Sep. 28, 2010

(54) METHOD AND APPARATUS TO PERFORM INCREMENTAL TRUNCATES IN A FILE SYSTEM

(75) Inventors: Shashidhar Bomma, Austin, TX (US); Joon Chang, Austin, TX (US); Ramesh Veeramalla, Austin, TX (US); Sreenivas Makineedi, Austin, TX (US)

(73) Assignee: International Business Machines, Corporation, Armonk, NY (US)

( * ) Notice: Subject to any disclaimer, the term of this patent is extended or adjusted under 35 U.S.C. 154(b) by 369 days.

(21) Appl. No.: 12/013,504

(22) Filed: Jan. 14, 2008

(65) Prior Publication Data

US 2009/0182792 A1     Jul. 16, 2009

(51) Int. Cl.
G06F 7/00 (2006.01)

(52) U.S. Cl. .................. 707/822; 707/685; 707/690; 707/795; 707/802

(58) Field of Classification Search ......... 707/685–686, 707/690–691, 795, 802, 821, 822
See application file for complete search history.

(56) References Cited

U.S. PATENT DOCUMENTS

| | | | |
|---|---|---|---|
| 5,727,206 A * | 3/1998 | Fish et al. ............. 707/999.202 |
| 5,828,876 A * | 10/1998 | Fish et al. ............. 707/999.001 |
| 6,064,379 A | 5/2000 | Demoney |
| 6,189,016 B1 * | 2/2001 | Cabrera et al. ........ 707/999.203 |
| 6,751,635 B1 * | 6/2004 | Chen et al. ............... 707/999.2 |
| 7,636,743 B2 * | 12/2009 | Erofeev ............... 707/999.204 |
| 2002/0069324 A1 * | 6/2002 | Gerasimov et al. ......... 711/114 |
| 2002/0103814 A1 | 8/2002 | Duvillier et al. |
| 2002/0138501 A1 * | 9/2002 | Dake .......................... 707/200 |
| 2004/0236798 A1 * | 11/2004 | Srinivasan et al. ........... 707/200 |
| 2005/0071336 A1 | 3/2005 | Najork et al. |
| 2005/0144178 A1 * | 6/2005 | Chrin et al. ................. 707/100 |
| 2007/0250552 A1 * | 10/2007 | Lango et al. ................. 707/205 |
| 2007/0288494 A1 * | 12/2007 | Chrin et al. ................. 707/100 |
| 2008/0222223 A1 * | 9/2008 | Srinivasan et al. .......... 707/205 |
| 2009/0119304 A1 * | 5/2009 | Preslan et al. ................. 707/10 |
| 2009/0228535 A1 * | 9/2009 | Rathi et al. ................. 707/204 |

OTHER PUBLICATIONS

Bjorn Beutel—"Saving Energy by Coordinating Hard Disk Accesses"—"Studienarbeit" in computer science 2001, pp. 1-46.*
Mads Bondo Dydensborg—"Direct Remote Access to Devices"—University of Copenhagen, computer Science, Oct. 17, 2000, (pp. 1-73).*
Gregory L. Chesson—"The Network Unix System" —Proceddings of the fifth ACM symposium on Operating Systems Principles 1975 (pp. 60-66).*

* cited by examiner

*Primary Examiner*—Jean B. Fleurantin
*Assistant Examiner*—Anh Ly
(74) *Attorney, Agent, or Firm*—David A. Mims; Robert C. Rolnik

(57) ABSTRACT

The present invention provides a computer implemented method for truncating a file in a file system. The file system receives a request to truncate a file to a target size, the file having a first inode. The file system creates a second inode to a transient directory, wherein the second inode holds a plurality of in-progress entries. The file system sets a target size in the first inode. The file system writes a truncate entry to a journal, the truncate entry comprising a predetermined size. The file system truncates the file by up to the predetermined size. The file system determines that the file is above the target size. Responsive to a determination that the file is above the target size, the file system repeats the truncating step and the determining step. Responsive to a determination that the file is not above the target size, the file system applies the in-progress entries from the transient directory.

5 Claims, 6 Drawing Sheets

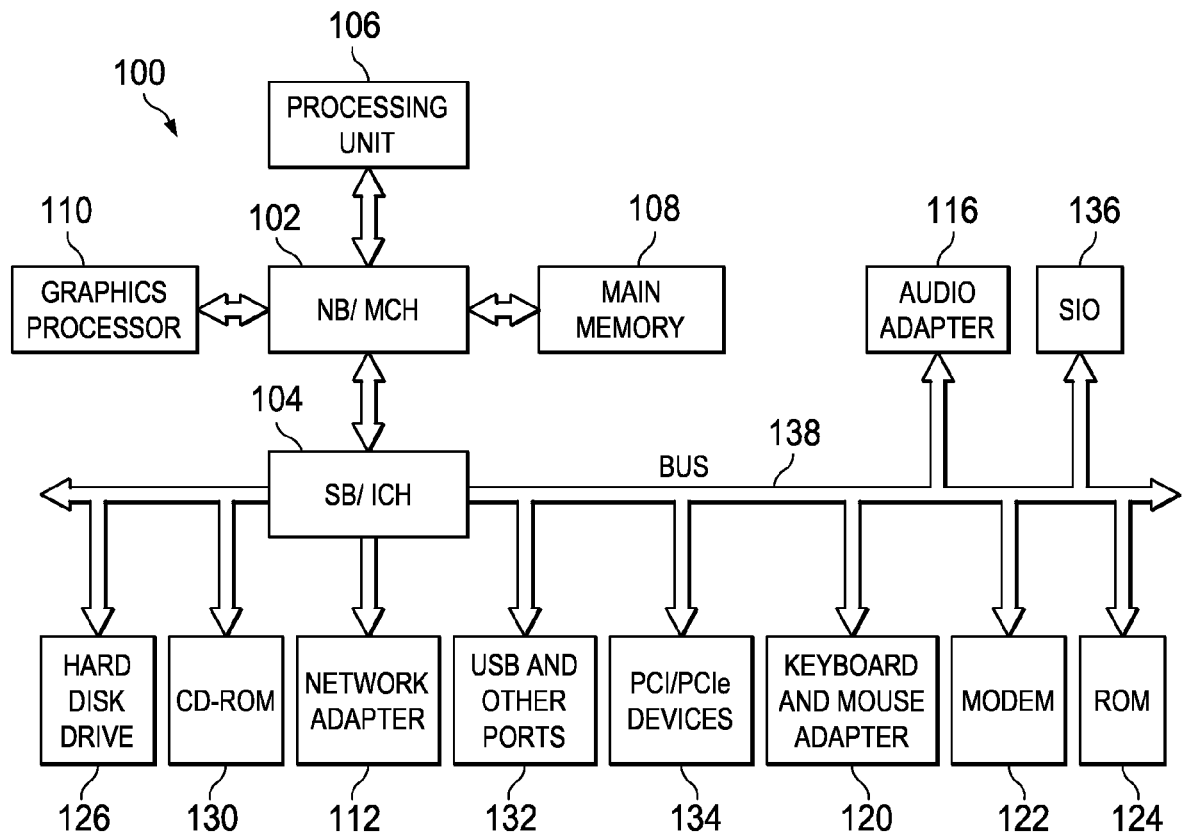
FIG. 1
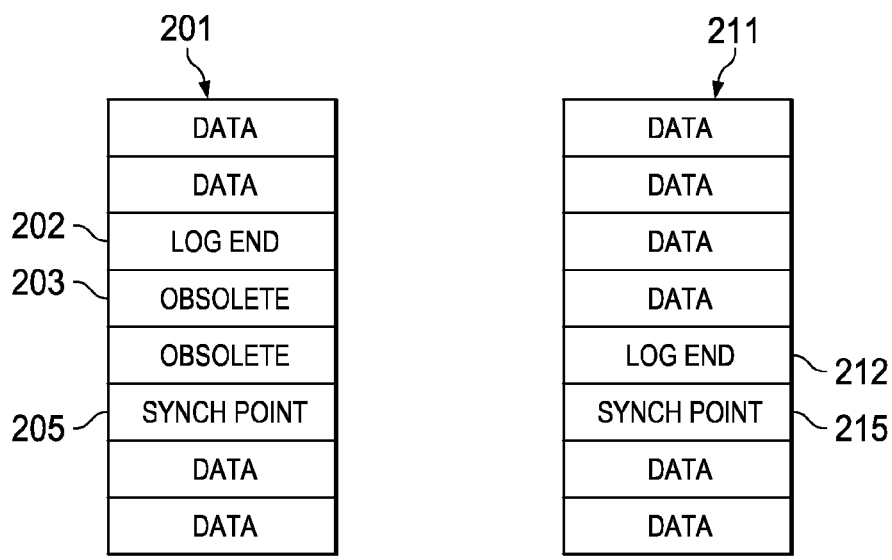
FIG. 2A
(PRIOR ART)
FIG. 2B
(PRIOR ART)

METHOD AND APPARATUS TO PERFORM INCREMENTAL TRUNCATES IN A FILE SYSTEM

BACKGROUND OF THE INVENTION

1. Field of the Invention

The present invention relates generally to a computer implemented method for preserving the atomicity of certain file operations. More specifically, the present invention relates to preserving entries from being overwritten in the journal of pending block device operations.

2. Description of the Related Art

Data processing systems used in financial, medical and other operations can be required to have high levels of reliability. For example, battery backup systems are used to assure continuity to limit exposure to fluctuating power. Nevertheless, some mechanical and electrical errors cause storage systems to fail at unpredictable times. Such faults can cause data to be lost if a write is occurring to a hard drive at the time of the fault.

Data processing systems organize one or more hard drives into one or more file systems, where each hard drive is treated as a block device. A file system is a data processing system operating methods and functions to organize files and their constituent data for access by one or more processors. In addition to hard drives, other storage media may be integrated into a file system, for example, flash memory, optical disks, and the like.

System designers may seek a goal to be efficient in using disk drives. Disk drives store information at speeds as slow as 100 times slower than access to RAM in the same data processing system. Consequently, system designers have adopted a system of virtual memory where information is first written to memory, and later written to disk blocks that correspond to the memory. Thus, a number of write operations may be performed that accrue several writes to memory while corresponding writes to disk are pending. In this scenario, the system virtually writes data to disk during the time that the actual writes are pending to disk. At some point, a triggering event causes the data processing system to write the pending operations to the disk. This arrangement can make disk writes more efficient, but has attendant risks.

In response to such risks, computer architects devised journaling file systems (JFS) to log each operation prior to actually making the write to a disk. A journaling file system is a file system that logs changes to a journal before actually writing them to the corresponding block device. A journal is a circular log used in a specially allocated area. A block device is a device that reads and writes data in multiple bytes in a sequence known as a block. The file system records disk accesses to the journal before and after completing each disk access. Such file systems are less likely to corrupt in the event of power failure or a system crash.

Typically, a journaling file system executes changes to a file system structure in two steps. Initially a data processing system writes information about pending file system updates to the journal. Next, the data processing system performs the change to the file system. If a fault occurs between the two steps, the journaling system recovers by scanning the journal and redoing any incomplete committed operations. Consequently, the file system reaches a consistent state.

FIGS. 2A and 2B are journals maintained by prior art file systems. A data processing system adds an entry to circular log or journal 201. Each entry corresponds to a file system access. The journal can be implemented as a buffer in memory. A buffer is a region of memory used to hold data temporarily while it is moved from one place to another. The data processing system adds each entry to memory 203 ahead of log-end 202. The data processing system accordingly moves the log-end forward one increment. The file system enters a journal entry in sequence for each pending operation. However, when the end of the tract of memory is reached, the file system may resume making journal entries at the beginning of the tract of memory, as is typical in any circular log. The oldest entry becomes obsolete when the corresponding change is written to the block device. Changes to the file system typically occur in the order that the changes are logged or entered to the journal.

In contrast to the log-end, synch point 205 contains an entry of data actually changed in on disk. Once the data processing system actually makes the change to the block device, the corresponding entry can become obsolete. A subsequent data processing system crash and log redo may cause the data processing system to omit scanning entries that are obsolete. However, the data processing system performing a log redo scans entries between and including log-end 202 and synch point 205. "Between" means moving backward from a log-end to the synch point, and if necessary, jumping from a physical beginning of a memory buffer to the physical end of the memory buffer as if such memory locations were contiguous.

Unfortunately, a log experiencing log wrap may overwrite data prior to the data becoming obsolete. Log wrapped log 211 has log-end 212 occupying memory adjacent to synch point 215. A next logged data will overwrite synch point 215, thus making some data inaccessible during a potential log redo. Consequently, a fault occurring during a log wrap will cause a data processing system to perform a log redo and miss instructions to change the file system.

Accordingly, it would be beneficial to develop a way to allow actual file system changes to be performed prior to a log wrap occurring. In addition, it can also be helpful if a mount integrity check is able to operate on the journal to commit changes that were logged to the journal.

SUMMARY OF THE INVENTION

The present invention provides a computer implemented method for truncating a file in a file system. The file system receives a request to truncate a file to a target size, the file having a primary inode. The file system creates a transient directory inode, wherein the second inode holds a plurality of in-progress entries. The file system sets a target size in the primary inode. The file system writes a truncate entry to a journal, the truncate entry comprising a predetermined size. The file system truncates the file by up to the predetermined size. The file system determines that the file is above the target size. Responsive to a determination that the file is above the target size, the file system repeats the truncating step and the determining step. Responsive to a determination that the file is not above the target size, the file system applies the in-progress entries from the transient directory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of a data processing system in accordance with an illustrative embodiment of the invention;

FIGS. 2A-2B are journals in accordance with an illustrative embodiment of the invention;

DETAILED DESCRIPTION OF THE PREFERRED EMBODIMENT

Figure 3A:
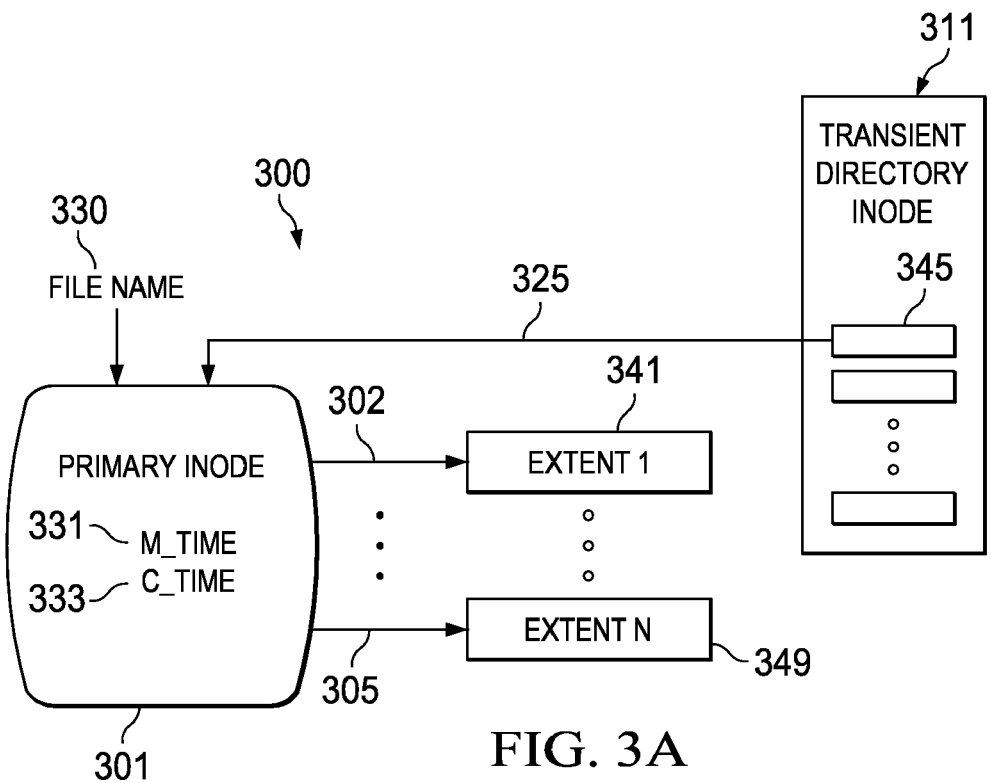
FIGS. 3A-3B are inode associations with a file in accordance with an illustrative embodiment of the invention.

With reference to FIG. 1, a block diagram of a data processing system is shown in which aspects of an illustrative embodiment may be implemented. Data processing system 100 is an example of a computer in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 are connected to north bridge and memory controller hub 102. Graphics processor 110 may be connected to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention are performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communication fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 and above-described examples are not meant to imply architectural limitations. For example, data processing system 100 also may be a tablet computer, laptop computer, or telephone device in addition to taking the form of a PDA.

The illustrative embodiments provide a computer implemented method for compartmentalizing a file truncate or remove operation in a virtual memory machine system. The file truncate is performed in two or more write operations to disk according to a predetermined size, each write operation logged individually. Accordingly, as the predetermined size is smaller than the size of the overall file truncate, each write operation may become physically written to disk ahead of overwriting a corresponding entry in a journal. Consequently, a logwrap may not occur during a time between logging a write operation and actually writing the data to disk. Thus, file consistency checks and restorations may be completed without loss of data caused by a logwrap in the journal.

FIG. 3A shows inodes associated with a file to be truncated or deleted in accordance with an illustrative embodiment of the invention. A file is a fundamental unit of logically organized data on one or more disks or other storage. A file can be allocated in a sequence of extents. An extent is a sequence of contiguous aggregate blocks allocated to a file system object as a unit. For example, in journaling file systems (JFS2), extents are organized for every JFS2 object through the use of an inode, explained further below.

In a file system, a file may be stored as multiple non-contiguous units. For example, a JFS2 stores file 300 as one or more extents referenced by an inode. An inode is a data structure that stores information relating to a file or other object in a file system. The inode may store a pointer or extent allocation descriptors (xad) for each extent of a file. An inode may have multiple tiers of xads to store files that exceed a certain extent count limit. FIG. 3A shows three types of inodes.

A first type of inode is a primary inode. A primary inode is an inode that references a file, for example, primary inode 301. In this illustration, primary inode 301 references extent 1 341 and extent N 349 by xad 302 and xad 305, respectively. Additional extents may be present and referenced by primary inode 301. Primary inode 301 may store or otherwise reference variables m_time 331 and c_time 333, which may be used to store a time of modification and creation, respectively, of the file. In addition, during a pending file operation, these variables may store information concerning the operation in progress.

A second type of inode is transient directory inode 311. A transient directory inode is a data structure that contains in-progress entries. An in-progress entry is a pointer or reference that references a file that is a target for truncation, including those files targeted for removal. Such a reference may be, for example, reference 325 from in-progress entry 345 to primary inode 301 of the file. The transient directory inode can be a system inode. While a file system operates normally, uninterrupted by power failures or other defects, the in-progress entries appear and are removed in intervals measured in seconds or less.

File name 330 is a convenient abstraction for a user to understand and manage a file. Additional details of a file may be stored as fields within the inode, for example, owner, group, creation time, permissions, and other file attributes. In addition, the inode may include an operation flag. The operation flag is a flag that indicates an operation that is pending with respect to the referenced file. In other words, the referenced file may be identified in a request to remove a file, wherein the operation is a request to remove. Accordingly, the operation flag may be set to a truncate indicator. A truncate indicator is a predetermined value interpreted by the file system to mean that an associated file is the target of a pending truncate operation. An operation flag can also track a number of buffers in use. A buffer in use is a tract of memory allocated to a block operation. Inode 301 stores truncate indicator in m_time field 331.

Another file detail may be a target size. A target size is a length associated with a file that is subject to a pending truncate operation or remove operation. The target size may be based on a length set in a request to truncate a file. Primary inode 301 stores a target size in c_time field 333. Data of the file may be accessible by referencing at least the primary inode 301.

Figure 3B:
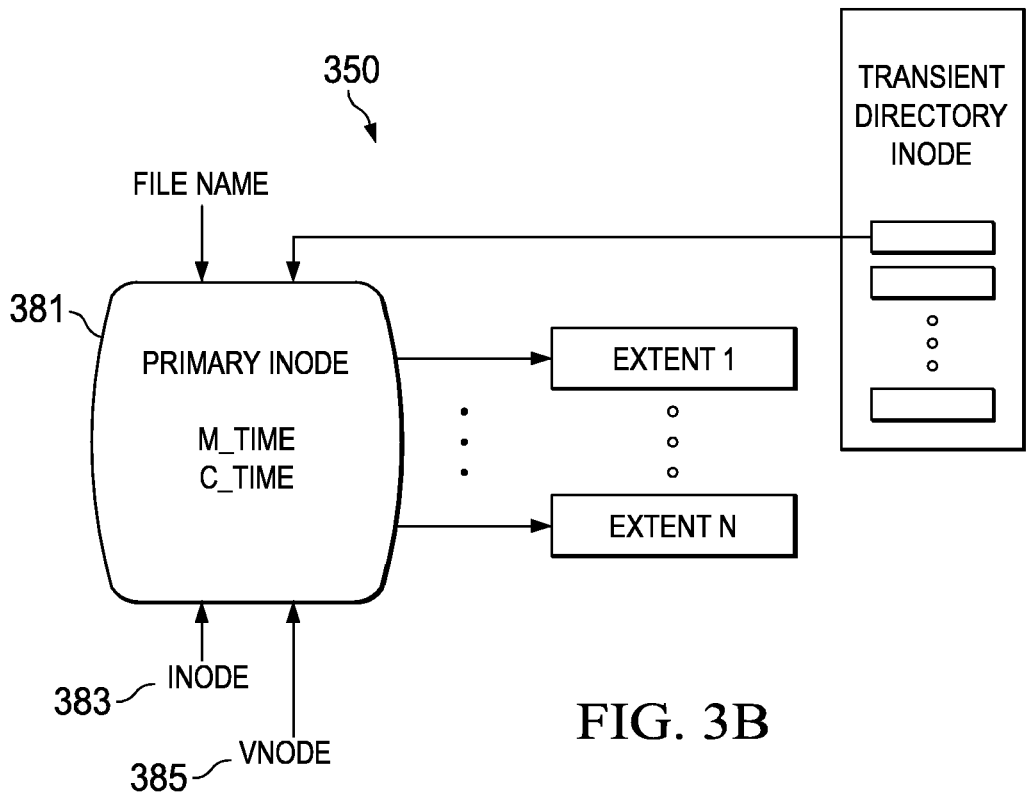

FIG. 3B shows inodes associated with a file to be truncated or removed in accordance with an illustrative embodiment of the invention. Like file 300 of FIG. 3A, file 350 is accessed by a primary inode, for example, primary inode 381. In addition to a filename reference, file 350 also has further references or pointers to data and metadata of the file. An open instance of a file is associated with a vnode or non-primary inode, for example, inode 383 and vnode 385. Inode 383 and vnode 385 both serve as additional references to file 350. A process may establish such references and may maintain a reference until the file is closed.

Figure 4:
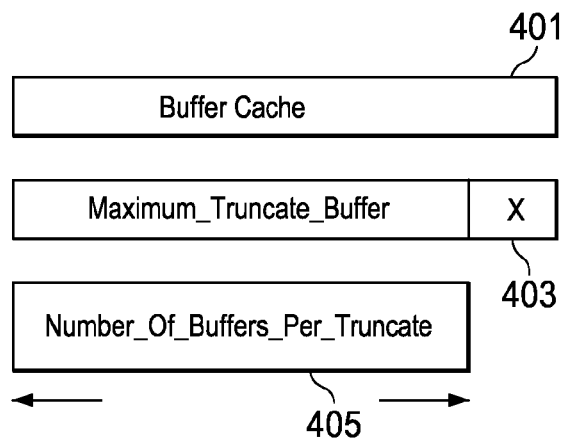
FIG. 4 is a comparison of a maximum buffer count to system tunables in accordance with an illustrative embodiment of the invention.

FIG. 4 is a comparison of a maximum buffer count to system tunables in accordance with an illustrative embodiment of the invention. A system tunable is a value established while configuring a file system that permits a user to set a system to perform with emphasis on one among several competing performance metrics. Attendant with a file system creation, a system administrator sets buffer cache 401 for performing operations with block I/O devices. A buffer cache is a reserved area in memory devoted to accruing pending blocks of data to write to storage or for accruing blocks read from storage. Typically, the reserved area will be assigned to a specific processor or core. A buffer cache mediates requests between a file system and the one or more block devices that provide physical storage. An upper limit to a number of buffers allowed for truncation is established in a system tunable for maximum truncate buffers, named "Maximum_Truncate_Buffers" 403. A further system tunable for a number of buffers per truncate, named "Number_of_Buffers_Per_Truncate" may be set to 80% of buffer cache 401, thus setting an upper limit to remove/truncate operation utilization of the buffers. This tunable, combined with methods explained below, may assure that the buffer cache is not exhausted by truncate operations. In other words, use of the tunable in the data processing system may avoid completely assigning this memory to blocks in pending storage operations. Accordingly, a user or system administrator may be allowed to also tune the number of buffers usable per truncate using Number_of_Buffers_Per_Truncate 405. The file system may limit a range of administrator-made entries to between zero and Maximum_Truncate_Buffers 403.

Figure 5A:
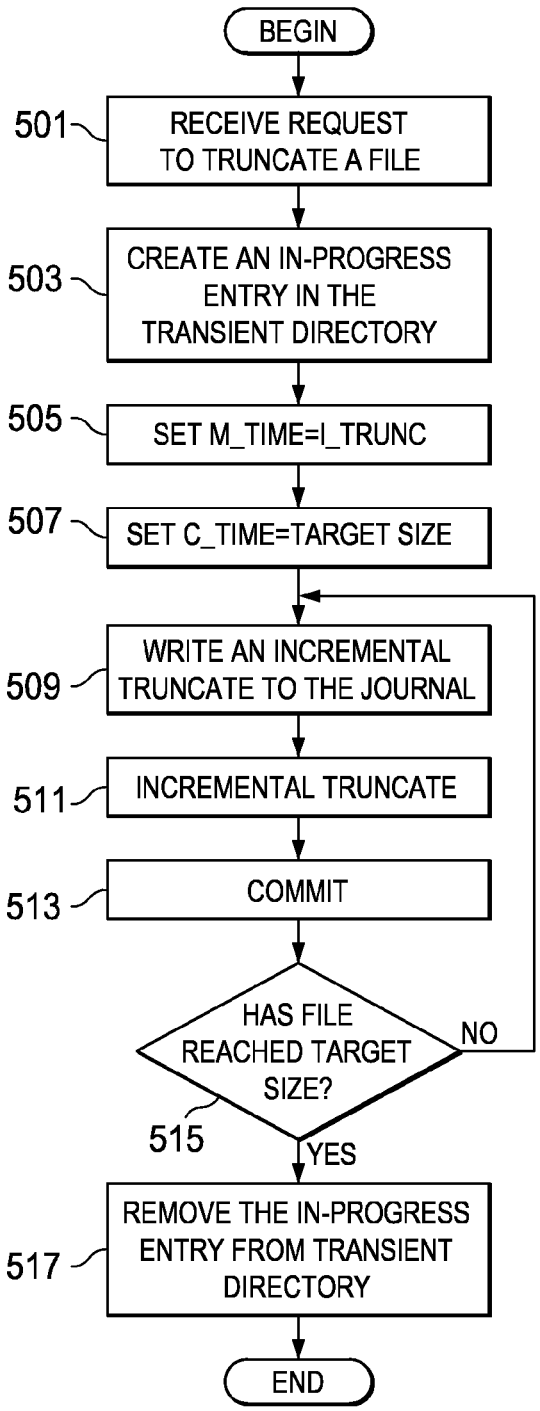
FIG. 5A is a flowchart of steps to truncate a file in accordance with an illustrative embodiment of the invention.

FIG. 5A is a flowchart of steps to truncate a file in accordance with an illustrative embodiment of the invention. Initially, a file system receives a request to truncate a file (step 501). A request to truncate a file is a command that specifies information such as, for example, a file and a target size. The file may be, for example, file 300 of FIG. 3A. The difference between the target size of the file and the file's current size is the truncate difference. Entries to a journal using prior art methods occupy increasingly larger memory space as a function of an increasing truncate difference. The illustrative embodiments of the present invention may occupy a correspondingly smaller space in the journal when an incremental truncate of the embodiment is smaller than the truncate difference of the prior art. The incremental truncate is explained further below.

The request to truncate matures into a truncate operation, carried out by a file system performing, for example, as explained below in steps 503-519. Next, the file system creates an in-progress entry in the transient directory inode (step 503). The file system may create an in-progress entry within, for example, an array. Such an in-progress entry may refer to the file or file inode, for example, inode 301 of FIG. 3. Next, the file system may set a truncate indicator by setting m_time to, for example, "I_TRUNC" (step 505). I_TRUNC may be a convenient name for a constant value used by the file system to represent a state of pending truncation. Next, the file system may set a target size in the inode by setting c_time to a target size (step 507). The target size may be a number set in the request to truncate the file in step 501. A user may enter a request to truncate a file at a data processing system command line. Alternatively, a program may send the request to truncate as a message to the file system. It is appreciated that such examples of requests are merely illustrative, and that many alternatives exist without departing from the scope of the invention.

Next, the file system may write an incremental truncate to the journal (step 509). The file system writes an incremental truncate in the form of a truncate entry. A truncate entry is a record of a pending truncate in the journal of a file system. The file system may write the truncate entry at memory adjacent to a log-end, for example, log-end 202 of FIG. 2A. The truncate entry includes a reference to the file and a truncated length. The truncated length can be exactly the length of the file reduced by the specified size. The specified size is explained further below. Moreover, as a file may be reduced by a series of incremental truncates, the truncated length can be the file size reduced by a whole multiple of the specified size. Next, the file system performs the incremental truncate (step 511). One incremental truncate can occupy less space in a journal than a truncate of the prior art that truncated the target file to a larger extent than the incremental truncate.

Next, the file system may commit the incremental truncate operation (step 513). The file system commits by writing a synch point at the location in the journal that step 509 entered the incremental truncate entry. The journal may be, for example, journal 201 of FIG. 2B. Alternatively, the file system may commit by discarding the applicable truncate entry.

Performing truncates on an incremental basis can reduce the chances of a log wrap to the extent the predetermined size is smaller than the size of a prior art truncate. The size of the prior art truncate is the difference between the file size before truncation as compared to the size of the file requested in the file truncation request. An embodiment of the invention may use the predetermined size as a fixed amount to truncate incrementally a file as part of a truncate operation involving truncating more data than the predetermined size. A predetermined size is a value that indicates a size for a truncate to be performed. In this embodiment, a file system uses the predetermined size in file operations concerning truncation or removal of a file larger than the predetermined size. It is appreciated that other embodiments may dynamically truncate by amounts smaller than the predetermined size. Accordingly, the predetermined size is smaller than a difference between the file size and the target size.

Next, the file system may determine whether the file has reached a target size (step 515). A negative determination, or a determination that the file is above the target size, results in the file system repeating steps 509, 511, and 513.

However, a positive determination at step 515 results in the file system removing the in-progress entry from the transient directory (step 517). A file system may, in the ordinary course of conducting housekeeping functions, reset the c_time and m_time to placeholder values, for example, null. Such activity may occur after step 517. Processing terminates thereafter.

Figure 5B:
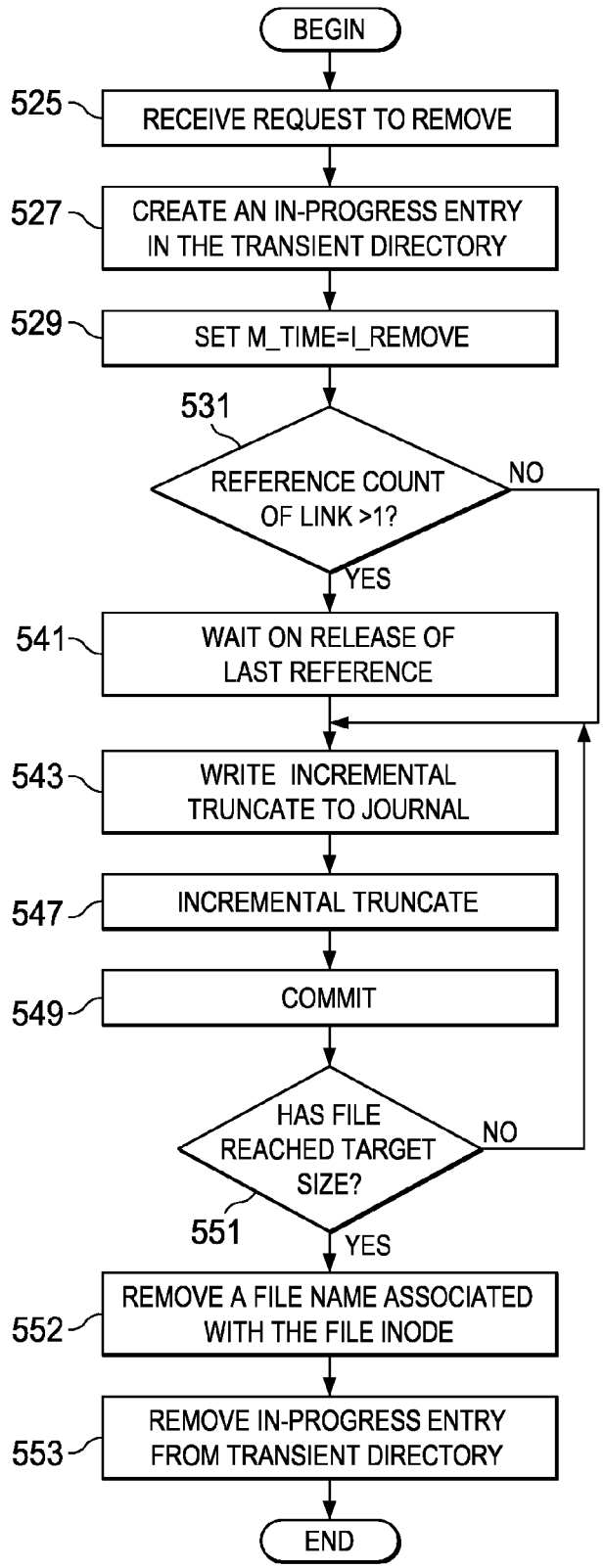
FIG. 5B is a flowchart of steps to remove a file in accordance with an illustrative embodiment of the invention.

FIG. 5B is a flowchart of steps to remove a file in accordance with an illustrative embodiment of the invention. Initially, a file system receives a request to remove the file (step 525). A request to remove a file may be an extension of a request to truncate a file. In both requests, an embodiment of the present invention provides incremental truncates of a file. However, unlike the request to truncate, the request to remove completes the operation by removing the file reference.

Next, the file system creates an in-progress entry in the transient directory (step 527). The file system sets a flag associated with the file to indicate file removal. The file system may perform this step by setting m_time to "I_REMOVE" (step 529). I_REMOVE may be a convenient name for a constant value used by the file system to represent a state of pending file removal. Next, the file system may determine if a reference count of links exceeds one (step 531). A link may be, for example, a vnode. A file reference count is all open instances associated with the file. If the reference count is greater than one, the file system may wait on a release of the references other than the inode (step 541). For example, references such as inode 383 and vnode 385 of FIG. 3B may remain unreleased until a process closes access to the file.

FIG. 5B is a flowchart of steps to remove a file in accordance with an illustrative embodiment of the invention. Initially, a file system receives a request to remove the file (step 525). Next, the file system creates an in-progress entry in the transient directory (step 527). The file system sets a flag associated with the file to indicate file removal. The file system may perform this step by setting m_time to "I_REMOVE" (step 529). I_REMOVE may be a convenient name for a constant value used by the file system to represent a state of pending file removal. Next, the file system may determine if a reference count of vnode file names or other links exceeds one (step 531). If the reference count is greater than one, the file system may force a release of the references other than the inode (step 541).

A negative determination at step 531 causes the file system to write an incremental truncate entry to the journal (step 543). In addition, after step 541, the file system may perform step 543. Next, the file system performs an incremental truncate (step 547). Next, the file system may commit the incremental truncate (step 549). Next, the file system determines whether the file has reached the target size (step 551). For a remove operation, the target size is zero.

A negative determination causes the file system to repeat steps 543, 547, and 549. However, a positive determination at step 551 causes the file system to remove a file name associated with the file inode (step 552). For example, if file 300 of FIG. 3A is targeted for removal, step 552 removes the link between file name 331 and inode 301 of FIG. 3A. Next, the file system removes the in-progress entry from the transient directory (step 553). Processing terminates thereafter.

Figure 5C:
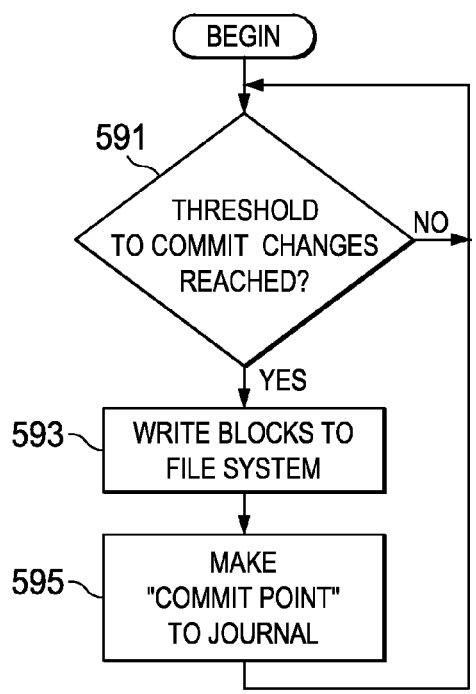
FIG. 5C is a flowchart of steps to set commit points in a journal in accordance with an illustrative embodiment of the invention.

FIG. 5C is a flowchart of steps to set commit points in a journal in accordance with an illustrative embodiment of the invention.

Figure 6:
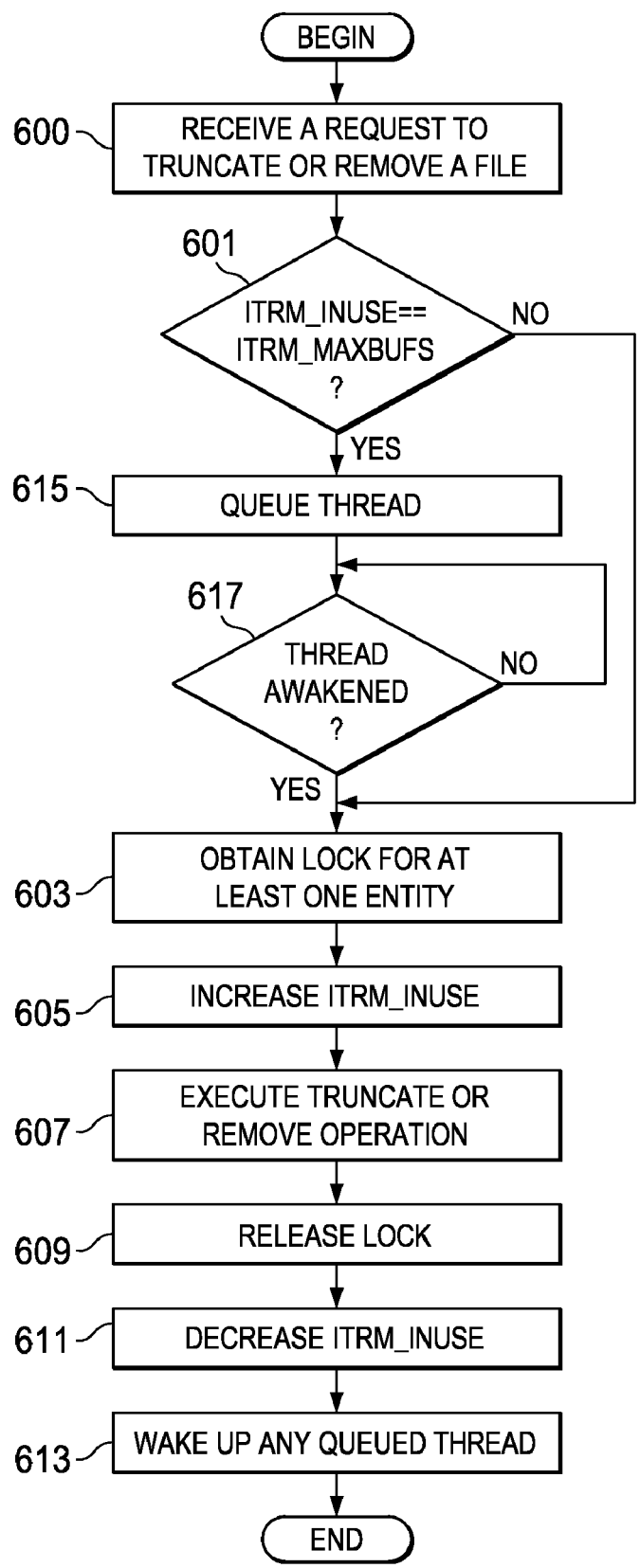
FIG. 6 is a flowchart for managing buffer caches in accordance with an illustrative embodiment of the invention.

FIG. 6 is a flowchart for managing buffer caches in accordance with an illustrative embodiment of the invention. A file system executing the steps in FIG. 6 may perform some initial housekeeping concerning buffers, followed by performing steps of either FIG. 5A or FIG. 5B, followed by further housekeeping concerning cache buffers.

Initially, the file system receives a request and begins some housekeeping. The file system receives a request to truncate or remove a file (step 600). Next, the file system determines whether a used buffer count is equal to a maximum buffer count. The file system performs this step by comparing ITrm_InUse with ITrm_MaxBufs, the used buffer count and the maximum buffer count, respectively (step 601). A used buffer count is the number of buffers used in the buffer cache. Such buffers are unavailable for further allocation in the file system. The maximum buffer count is a number or percentage of buffers that the file system limits for use in the buffer cache. If the two values are equal, then the file system has reached the limit to using cache buffers. Consequently, the file system queues the thread for this process (step 615). Subsequently, the process may be awakened (step 617). Following steps 601 and 617, the file system obtains a lock to at least one entity (step 603). An entity is a memory stored data structure. The entity can be, for example, a cache, buffer, entry or the like. A lock is a data structure that signals that a corresponding entity or other memory is reserved for use by a thread. In this case, the tract of memory is a buffer of the buffer cache. Next, the file system increases the used buffer count (step 605). This increase may be an addition by one.

Next, the file system may perform the journalled action requested in step 600. That is, the file system may execute either a truncate or a remove operation (step 607). If a truncate operation, the file system may perform steps 503-519 of FIG. 5A, for example. Otherwise, if a remove operation was requested, the file system may perform, for example, steps 527-553 of FIG. 5B.

Next, the file system performs some housekeeping to reflect a completed use of a buffer cache. The file system releases a lock on the entity (step 609). Next, the file system decreases the used buffer count (step 611). Next, the file system may wake up any queued thread (step 613). Processing terminates thereafter.

Figure 7:
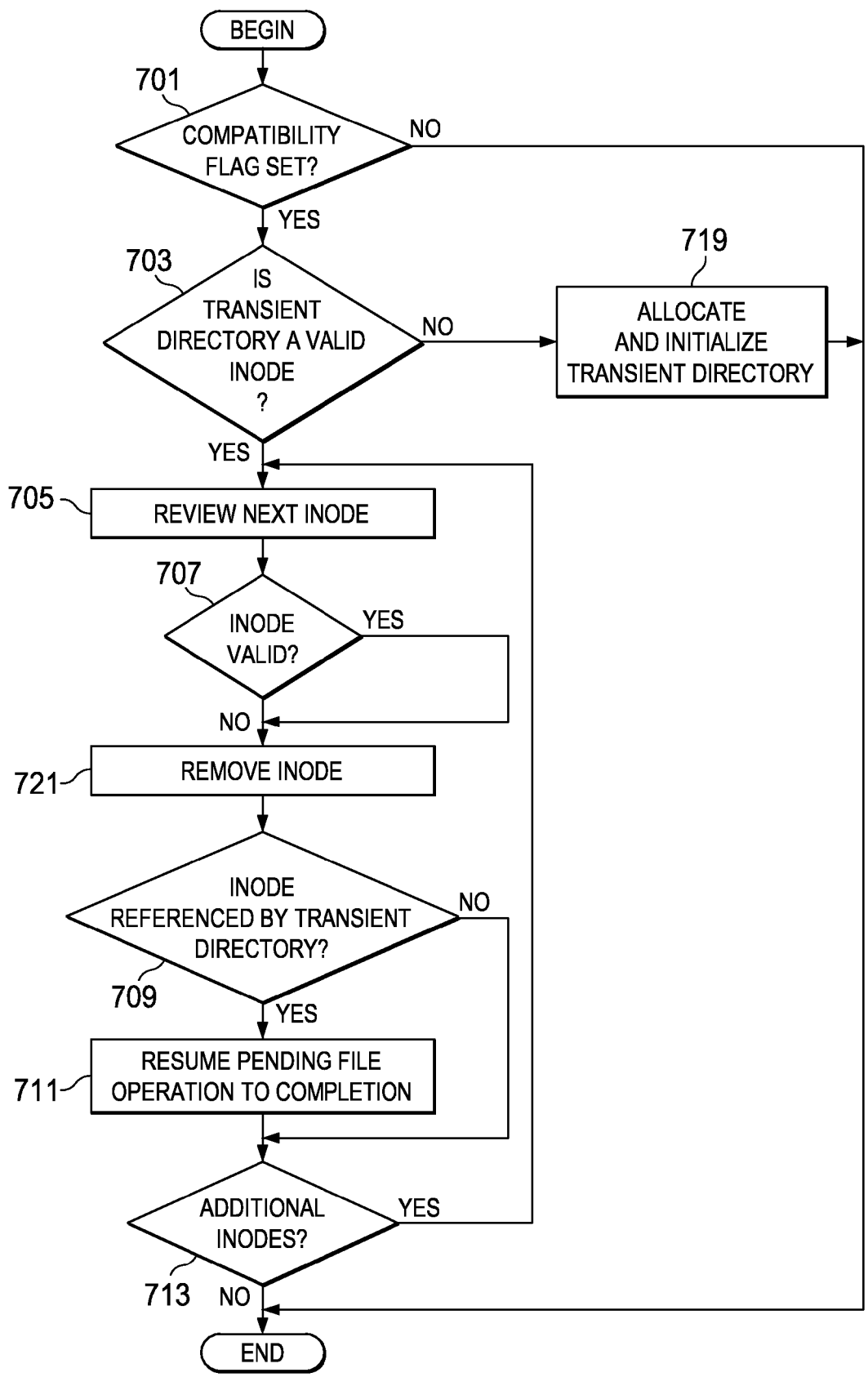
FIG. 7 is a flowchart of steps for recovering a file system in accordance with an illustrative embodiment of the invention.

FIG. 7 is a flowchart of steps for recovering a file system in accordance with an illustrative embodiment of the invention. A file system may execute the steps of FIG. 7 in response to booting up one or more hard drives or other storage. One or more steps may be performed by a data processing system executing computer program instructions of a "mount" command, commonly available data processing system, such as AIX®. Initially, the file system may determine if a compatibility flag is set (step 701). The compatibility flag is a value set in a file system superblock to indicate that a file system is maintained by incremental truncates. If no compatibility flag is set, processing terminates.

However, if the compatibility flag is set, the file system determines whether the transient directory is a valid inode (step 703). If no valid inodes exist for the transient directory, the file system may allocate and initialize a transient directory (step 719). The transient directory can be allocated from system inodemap. Processing terminates thereafter. However, if a valid inode exists, the file system examines each inode in sequence.

The file system reviews the next inode (step 705). If no inodes have been reviewed since step 701, the file system starts with the first inode in the transient directory. Next, the file system determines whether the inode is valid (step 707). If the inode is not valid, the file system removes the inode (step 721).

If the inode is valid, the file system determines if the inode is referenced by the transient directory (step 709). If the inode is referenced by the transient directory, the file system resumes the pending file operation to completion (step 711). A pending file operation is an inode that stores an operation flag as explained above. To the extent that the pending file operation is logged to the journal, a mount operation may be able to perform further processing by referencing applicable m_time and C_time fields of the file associated with the inode. Such operations can be similar to steps 505 through 517 explained above. For example, the "mount," command used in an AIX® system can be set to perform using an integrity flag.

After steps 711, 721, and a negative result to step 709, the file system determines if additional inodes remain unreviewed (step 713). If so, the file system continues reviewing the next inode at step 705. An additional inode is a second inode contained in the transient directory. Otherwise, processing terminates thereafter.

The illustrative embodiments permit a truncate or a remove operation to occupy a briefer interval between logging and committing disk accesses than available in the prior art. In addition, limitations are established by one or more illustrative embodiments to guard against buffer cache exhaustion. Moreover, forward progress may be made following a crash. Consequently, the data processing system may atomically complete the operation begun prior to the crash, for example, a truncate operation or a remove operation. Consistency of a file system may be accomplished using mount processing following a storage system crash. An illustrative embodiment may scan the transient directory and complete the operation before the file system is made accessible. In case of a file remove operation, objects or in-progress entries left in the transient directory will be removed. In case of a file truncate operation, objects left in the transient directory will be further truncated to the target size.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for truncating a file in a file system, the method comprising:
   receiving a request to truncate the file to a target size, the file having a primary inode;
   creating a transient directory inode, wherein the transient directory inode holds a plurality of in-progress entries;
   setting a target size in the primary inode;
   writing a truncate entry to a journal, the truncate entry comprising a predetermined size;
   truncating the file by up to the predetermined size;
   determining that the file is above the target size;
   responsive to a determination that the file is above the target size, repeating the truncating step and the determining step;

responsive to a determination that the file is not above the target size, apply the in-progress entries from the transient directory inode;

determining whether a used buffer count is equal to a maximum buffer count;

responsive to a determination that the used buffer count is not equal to the maximum buffer count, obtaining a lock to at least one entity;

responsive to a determination that the used buffer count is equal to the maximum buffer count, increasing the used buffer count;

responsive to a determination that the used buffer count is equal to the maximum buffer count, performing the receiving, creating, setting, writing, determining, repeating, and removing steps;

releasing the lock; and decreasing the used buffer count of a buffer cache, whereby the buffer cache is not exhausted.

2. The computer implemented method of claim 1 further comprising:

setting an operation flag in the primary inode to track buffers in use.

3. The computer implemented method of claim 2 further comprising:

removing the file.

4. The computer implemented method of claim 1 further comprising:

determining that a used buffer count is equal to a maximum buffer count;

responsive to a determination that the used buffer count is equal to a maximum buffer count, queuing a thread; and awakening the thread.

5. The computer implemented method of claim 4, wherein the step of increasing the used buffer count comprises increasing the used buffer count by one.

* * * * *